United States Patent
Kleine-Altekamp et al.

(10) Patent No.: US 6,914,879 B1
(45) Date of Patent: Jul. 5, 2005

(54) NETWORK ELEMENT WITH REDUNDANT SWITCHING MATRIX

(75) Inventors: Harald Kleine-Altekamp, Sachsenheim (DE); Volkmar Heuer, Ditzingen (DE); Rainer Sigloch, Remseck (DE)

(73) Assignee: Alcatel, Paris (FR)

( * ) Notice: Subject to any disclaimer, the term of this patent is extended or adjusted under 35 U.S.C. 154(b) by 801 days.

(21) Appl. No.: 09/689,887

(22) Filed: Oct. 13, 2000

(30) Foreign Application Priority Data

Oct. 15, 1999 (DE) .......................................... 199 49 996

(51) Int. Cl.⁷ ............................. H04J 1/16; H04L 1/00
(52) U.S. Cl. ...................................... 370/219; 370/220
(58) Field of Search ................................ 370/216, 217, 370/218, 219, 220

(56) References Cited

U.S. PATENT DOCUMENTS

| | | | | |
|---|---|---|---|---|
| 4,730,303 A | * | 3/1988 | Suzuki | 370/217 |
| 5,781,527 A | * | 7/1998 | Read et al. | 370/216 |
| 5,903,544 A | * | 5/1999 | Sakamoto et al. | 370/218 |
| 6,202,170 B1 | * | 3/2001 | Busschbach et al. | 714/11 |
| 6,226,260 B1 | * | 5/2001 | McDysan | 370/216 |
| 6,226,261 B1 | * | 5/2001 | Hurtta et al. | 370/219 |
| 6,285,656 B1 | * | 9/2001 | Chaganty et al. | 370/228 |
| 6,327,260 B1 | * | 12/2001 | McGrew | 370/385 |
| 6,359,858 B1 | * | 3/2002 | Smith et al. | 370/217 |
| 6,639,895 B1 | * | 10/2003 | Helles et al. | 370/219 |
| 6,650,803 B1 | * | 11/2003 | Ramaswami et al. | 385/17 |
| 6,724,756 | * | 4/2004 | Fourie et al. | 370/360 |

FOREIGN PATENT DOCUMENTS

EP 857 000 A2 5/1998
EP 889 665 A2 1/1999

OTHER PUBLICATIONS

R. Castelli, et.al.: "Technologie der SDH–Netzelemente: die Hardware–Platform", Elekulsches Nachrichtenwesen Apr. 1993, pp. 312–321.*

Thalmann M. et al: "A Single–Chip Solution for an ADM–1/TMX–1 SDH Telecommunication Node Element", ASIC/SOC Conference, 1999, Proceedings, Twelfth Annual IEE International Washington, D.C., USA Sep. 15–18, 1999, Piscataway, NJ USA IEEE, US, Sep. 15, 1999.

* cited by examiner

*Primary Examiner*—Chau Nguyen
*Assistant Examiner*—Blanche Wong
(74) *Attorney, Agent, or Firm*—Sughrue Mion, PLLC

(57) ABSTRACT

Network elements such as digital crossconnects are provided with a 1:1 redundancy of, among other things, the switching matrix in order to maintain their functionality in the event of a hardware failure. Against disasters such as fires, explosions, or floods in which all equipment in a room is destroyed, the redundancy used in prior-art network elements can afford no protection.

To remedy this, the two switching matrices (21, 22), which are present anyhow, are installed in separate rooms (31, 32), i.e., a single network element is divided between two rooms. To this end, the interface modules (23, 24) are divided into two groups, and each of the groups is assigned to a respective one of the switching matrices. A respective one of the switching matrices and a respective one of the groups of interface modules are arranged in, e.g., a cabinet or rack so as to form a unit, and the units are interconnected by simple internal links (34) such that both switching matrices (21, 22) are connected to all interface modules (23, 24).

9 Claims, 5 Drawing Sheets

NETWORK ELEMENT WITH REDUNDANT SWITCHING MATRIX

BACKGROUND OF THE INVENTION

This invention relates to a network element, particularly to a network element for a synchronous digital communications network such as SDH or SONET.

Such a network element is known from an article by R. Castelli et al, "Technologie der SDH-Netzelemente: die Hardware-Plattform", Elektrisches Nachrichtenwesen 4/1993, pp. 312–321. In FIGS. 9 and 10 of that article, a crossconnect for a digital communications network based on the Synchronous Digital Hierarchy (SDH) standard is shown. It has a number of interface modules and two switching matrices. Each of the switching matrices is connected to each of the interface modules and serves to switch paths between the interface modules. One of the switching matrices is always available as an active switching matrix, and the other is available as a standby matrix in the event of a failure. A controller detects a fault condition of the active switching matrix and switches to the standby matrix, which is then used as a new active switching matrix. Thus, the crossconnect uses 1:1 redundancy, which protects against hardware errors in the switching matrix, the core element of the crossconnect. For the interface modules, 1:N redundancy may additionally be provided, so that an individual standby module is available for a number N of interface modules to perform the function of a failed module.

It may happen, however, that as a result of fire, an explosion, or a flood disaster, all equipment in a room is destroyed and thus fails. The redundancy used in prior-art network elements cannot protect against such a disaster, because all modules of the network element are affected by the disaster at the same time.

To protect against such a disaster, it is known to install two like network elements in two separate rooms and connect them with one another. If one network element fails, at least part of the traffic, e.g., prioritized traffic such as emergency numbers, can still be handled by the second network element. Such a structure is shown in FIG. 1. Its disadvantages are the high capital expenditure for two complete pieces of equipment and the size of the switching matrices that are required to ensure that even with protection mechanisms such as MSP (Multiplexer Section Protection) and SNCP (Subnetwork Connection Protection), the network elements are 100% nonblocking.

SUMMARY OF THE INVENTION

It is an object of the invention to provide a network element which requires less hardware and can be implemented at lower cost than conventional network elements and still provides at least partial protection against disasters such as fire, explosion, or inundation which destroy all equipment installed in a room. This object is attained by a network element for a digital communications network, comprising: a number of interface modules, a first, active switching matrix connected to the interface modules for switching paths between the interface modules, a second, redundant switching matrix also connected to the interface modules, and a controller for detecting a fault condition of the active switching matrix and for switching to the redundant switching matrix, which is then used as a new active switching matrix, wherein the interface modules are divided into two groups, and each of the two switching matrices is combined with a respective one of the groups of interface modules to form two separate units, which are interconnected by internal links, whereby the units can be installed in two separate rooms.

BRIEF DESCRIPTION OF THE DRAWINGS

The invention will become more apparent by reference to the following description of an embodiment taken in conjunction with FIGS. 2 to 5 of the accompanying drawings. In the drawings.

DETAILED DESCRIPTION OF THE INVENTION

A basic idea of the invention is to install the two switching matrices, which are present anyhow, in two separate rooms, i.e., to divide a single network element between two rooms. To do this, the interface modules are divided into two groups, and each of the groups is assigned to a respective one of the switching matrices. A respective one of the switching matrices and a respective one of the groups of interface modules are arranged in, e.g., a cabinet or rack so as to form a unit, and the units are interconnected by simple internal links in such a way that both switching matrices are connected to all interface modules.

Figure 2:
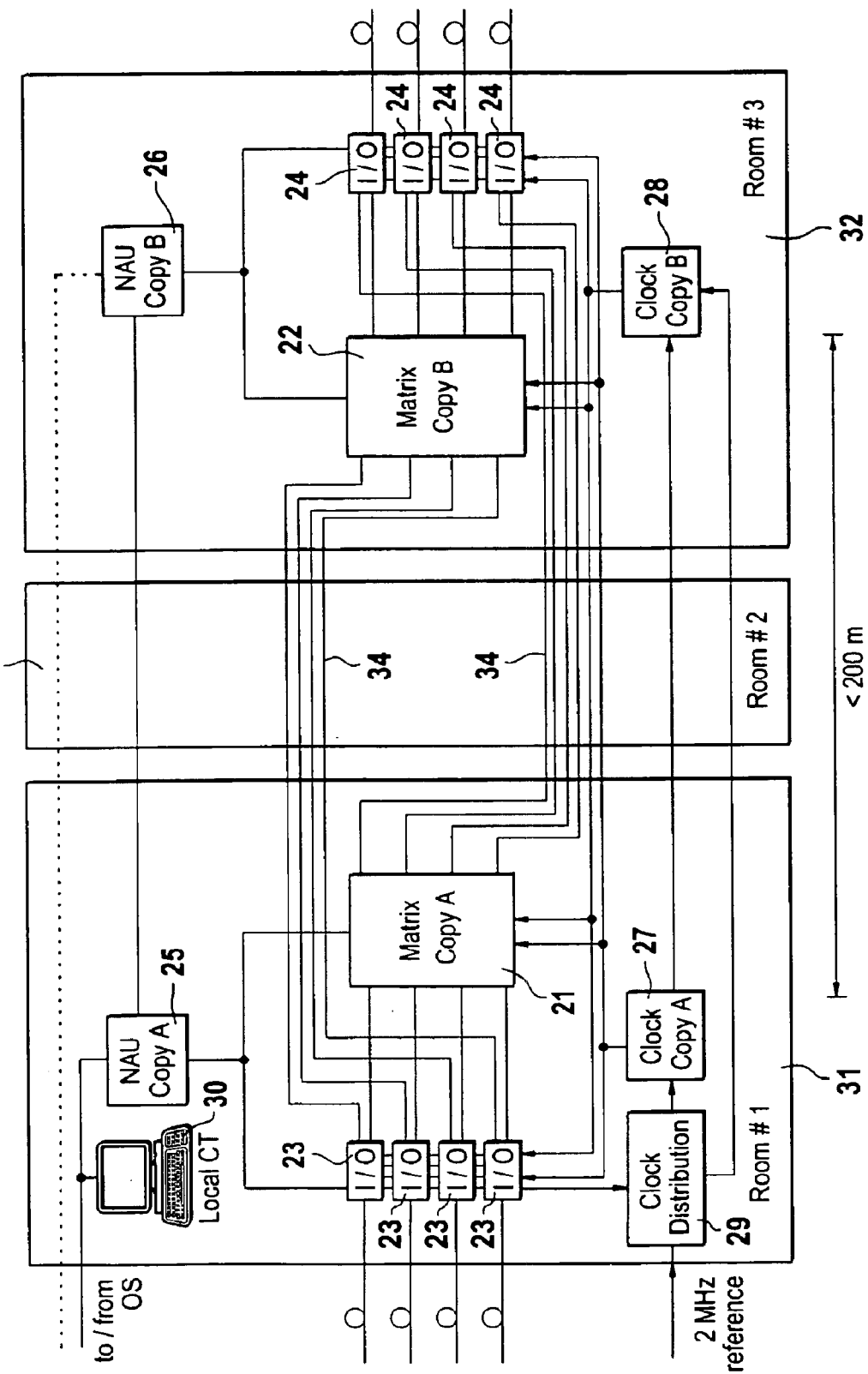
FIG. 2 shows a network element according to the invention, which is installed in two separate rooms.

Such a network element according to the invention is illustrated in FIG. 2. It is a digital crossconnect for a synchronous digital communications network, which is designed to switch fixed paths for data transmissions within the network. The core element of the crossconnect is a switching matrix 21, 22, in which the connections between interface modules 23, 24 are switched. For reasons of redundancy, the crossconnect has two such switching matrices, designated 21 ("Copy A") and 22 ("Copy B"). During normal operation, i.e., with no hardware fault present, Copy A, 21, operates as an active switching matrix, and Copy B, 22, is available as a standby matrix in the event of a failure.

In the embodiment, the crossconnect has eight optical interface modules 23, 24 for the connection of optical fibers of the communications network. Each of the interface modules is connected to both switching matrices 21, 22. At the interface modules, communications signals are received from and transmitted into the communications network. These are time-division multiplex signals of the STM-N type (Synchronous Transport Module, N=1, 4, 8, 16, 64), which contain user signals to be switched. The user signals are packed in containers in accordance with a multiplex hierarchy. To switch a path in the network, individual ones of these containers are switched by the switching matrix from a receiving interface module to a transmitting interface module, where the containers are reassembled into a transport frame and transmitted. In the interface modules, the received communications signals are converted to electrical form and demultiplexed, and the containers of the signals are passed to both switching matrices.

According to the invention, the interface modules are divided into two groups. The first group comprises the four interface modules 23, shown in FIG. 2 at the left, and the second group comprises the four interface modules 24, shown in FIG. 2 at the right. The first group 23 and the first, active switching matrix 21 are arranged in a first rack so as to form a first unit, and are installed in a first room 31 (room #1). The second group 24 and the second, redundant switching matrix 22 are arranged in a second rack so as to form a second unit, and are installed in a second room 32 (room #3). The two units are interconnected by a plurality of internal links 34. The internal links 34 are simple, short-range optical links that are designed for a maximum fiber length of about 200 meters. Such simple and low-cost optical links are known per se and have many uses, e.g., in LANs to interconnect computers or in interrack communication. They differ from the links at network level in that no single-mode lasers and fibers are required, and that because of the short link length (max. 200 m), no dispersion compensation is necessary. Alternatively, electric links can be employed. The internal links 34 run through a third room 33 (room #2).

The crossconnect is controlled by a first controller 25 in a manner known per se. The controller is connected to a local control terminal 30 in order to be able to install, maintain, and upgrade the crossconnect in situ. In addition, controller 25 is connected to the network management system of the communications network and receives over this connection instructions relating to the paths to be switched. The controller controls the active switching matrix and specifies the paths to be switched by the matrix. Alarms and fault messages are signaled by the interface modules and the active switching matrix to the controller. The latter also serves to detect error conditions caused, for example, by a hardware failure, and to switch to a standby module in the event of a failure. Since 1:1 redundancy is provided for the switching matrices, in the event of a hardware failure in the active switching matrix 21, controller 25 will switch to the second, redundant switching matrix 22, which then performs the function of a new, active switching matrix, and will deactivate the hitherto active matrix.

The controller has a hard disk or a similar mass storage, on which configuration parameters of the crossconnect are stored in the form of a database, and on which alarms and messages of the individual components of the crossconnect are stored and can be retrieved by the higher-level management system.

In an advantageous development of the invention, two separate controllers 25, 26 are provided, each of which is spatially associated with, and installed in the same room as, a respective one of the units. During operation, the first controller 25 operates as an active controller and the second controller 26 is available as a standby controller in the event of a failure. Controllers 25, 26 are connected with one another. Advantageously, the second controller 26, too, has a connection to the higher-level network management system of the communication network.

The crossconnect also has a clock supply 27, which supplies it with an internal reference clock. The clock supply is synchronized either to an external 2-MHz reference clock or to a clock signal derived from one of the communications signals received at the interface modules. Advantageously, the crossconnect has a second, redundant clock supply 28 as a standby unit, with each of the clock supplies 27, 28 being spatially associated with a respective one of the units. A clock distributor 29 ensures that both clock supplies are synchronized to the same external reference clock. In the event of a failure of the external reference clock source, the two clock supplies can also operate in a free, unsynchronized mode ("holdover mode").

The redundant components of the crossconnect, i.e., the second switching matrix 22, the second clock supply 28, and the second controller 26, are also functional during normal operation and perform the same functions as their active counterparts. Thus, the standby components also work during normal operation. Only their output signals are not selected, but ignored by the active components during normal operation. This ensures that in the event of a failure, it is only necessary to switch to the output signals of the standby components, which is done by selecting the latter as active components by the other components.

The following describes how a disaster, such as a fire, an explosion, or a flood, which causes all equipment installed in one room to fail affects the operation of the crossconnect.

Figure 3:
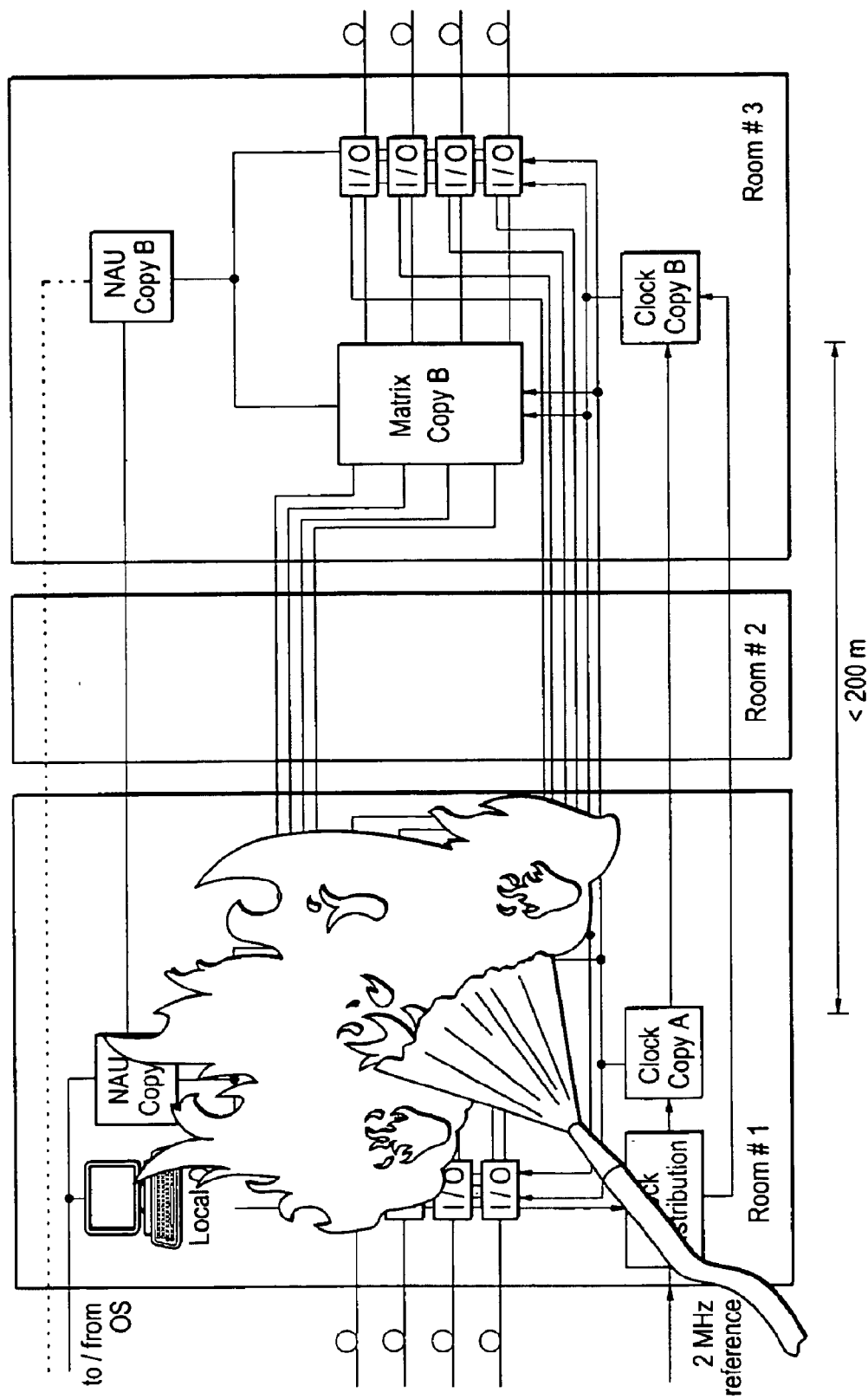
FIG. 3 shows the network element of FIG. 2 in the presence of fire in the first room.

FIG. 3 shows that a fire is destroying all equipment in the first room 31. As a result of the fire, all traffic of the first room, i.e., all communications signals that arrive or are transmitted in the first room, is lost. The effect on the traffic of the second room 32 and on the controllability of the crossconnect is as follows:

The interface modules that had originally selected data transmissions from the first switching matrix 21 now select the second switching matrix 22. This causes a short interruption ("traffic hit") due to the switchover.

If the first clock supply 27 operated as a master, i.e., as an active clock supply, the second clock supply 28 will assume the master role. In the configuration shown in FIG. 2, all reference clocks used for synchronization were derived from interface modules 23 in the first room. Therefore, the second clock supply, as the new active clock supply, changes to the holdover mode. To avoid this, it is advantageous to always select interface modules from both groups as possible clock sources.

All subcircuits ("boards") of the crossconnect that had originally selected Copy A of the matrix as the active matrix now select Copy B. As mentioned above, this causes a short "traffic hit".

The status of the second controller 26 remains as it is ("standby"). All alarms and messages are still being stored on the hard disk of the second controller 26.

As the local control terminal is no longer usable, a new control terminal must be connected to the second controller to regain control over the crossconnect. The same applies for the connection to the higher-level network management system. If the first controller 25 was active before the fire, the second controller 26 must now be set to the active status before access to the crossconnect is possible. The activities in the control system do not affect the data transmissions, however.

From the explanations it is apparent that the crossconnect, as least as far as the traffic arriving and transmitted in the second room is concerned, is fully operational. Via the central network management system, the traffic in the network can be rerouted so that at least prioritized traffic is unaffected by the fire.

Figure 4:
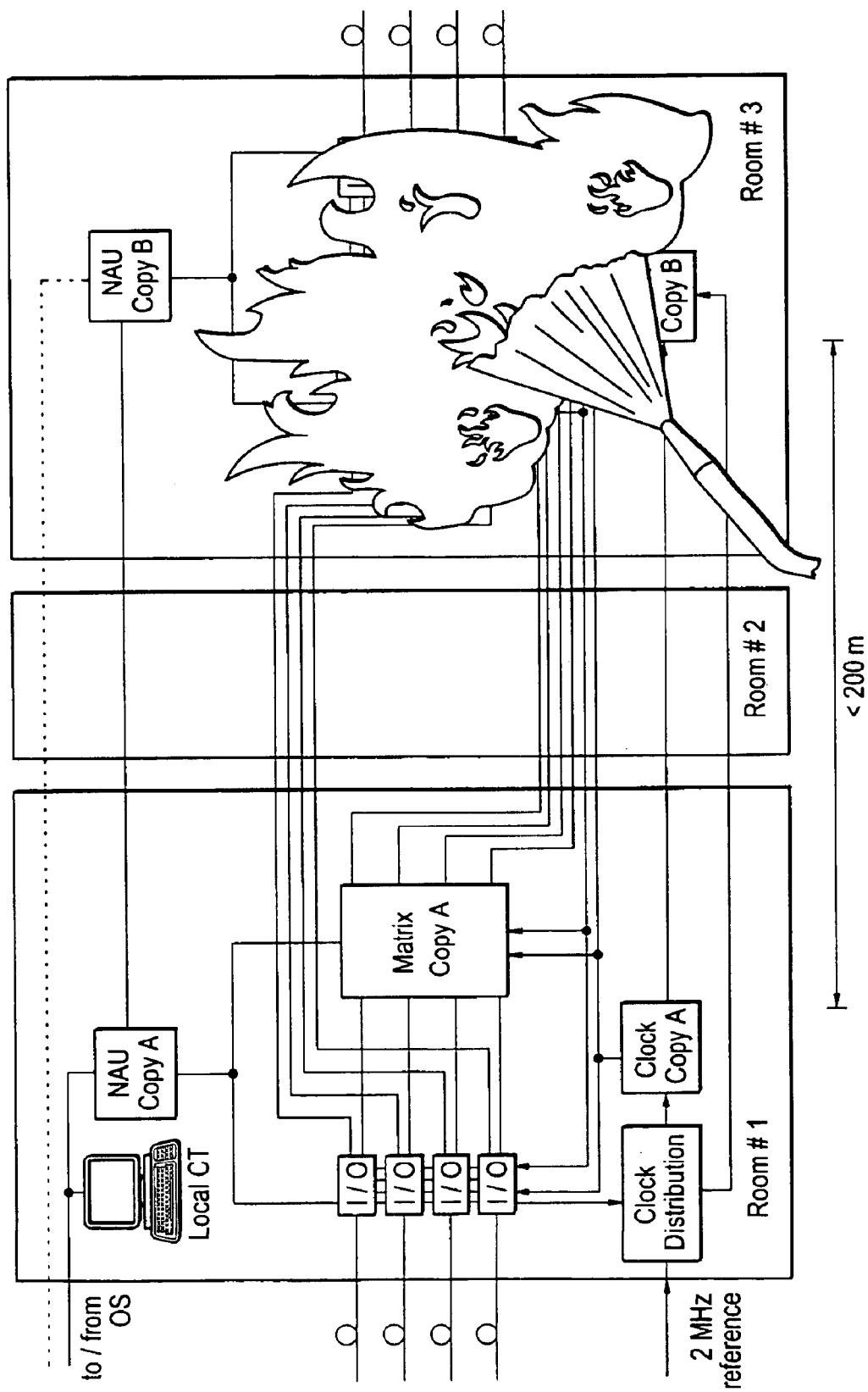
FIG. 4 shows the network element of FIG. 2 in the presence of fire in the second room.

FIG. 4 illustrates that a fire in the second room 32 is destroying all equipment installed in this room. Since the crossconnect components installed in the first room were already active, no switchover need be effected. If the crossconnect components had selected the second switching matrix as the active matrix or the second clock supply before the fire, they will now switch to the respective counterparts. This may cause a short interruption ("traffic hit"), as in the case of FIG. 3. The status of the controller remains as it was before the fire (here: "active"). Alarms and messages are still being stored on the hard disk of the first controller. The crossconnect can continue to be controlled via control terminal 30.

Figure 5:
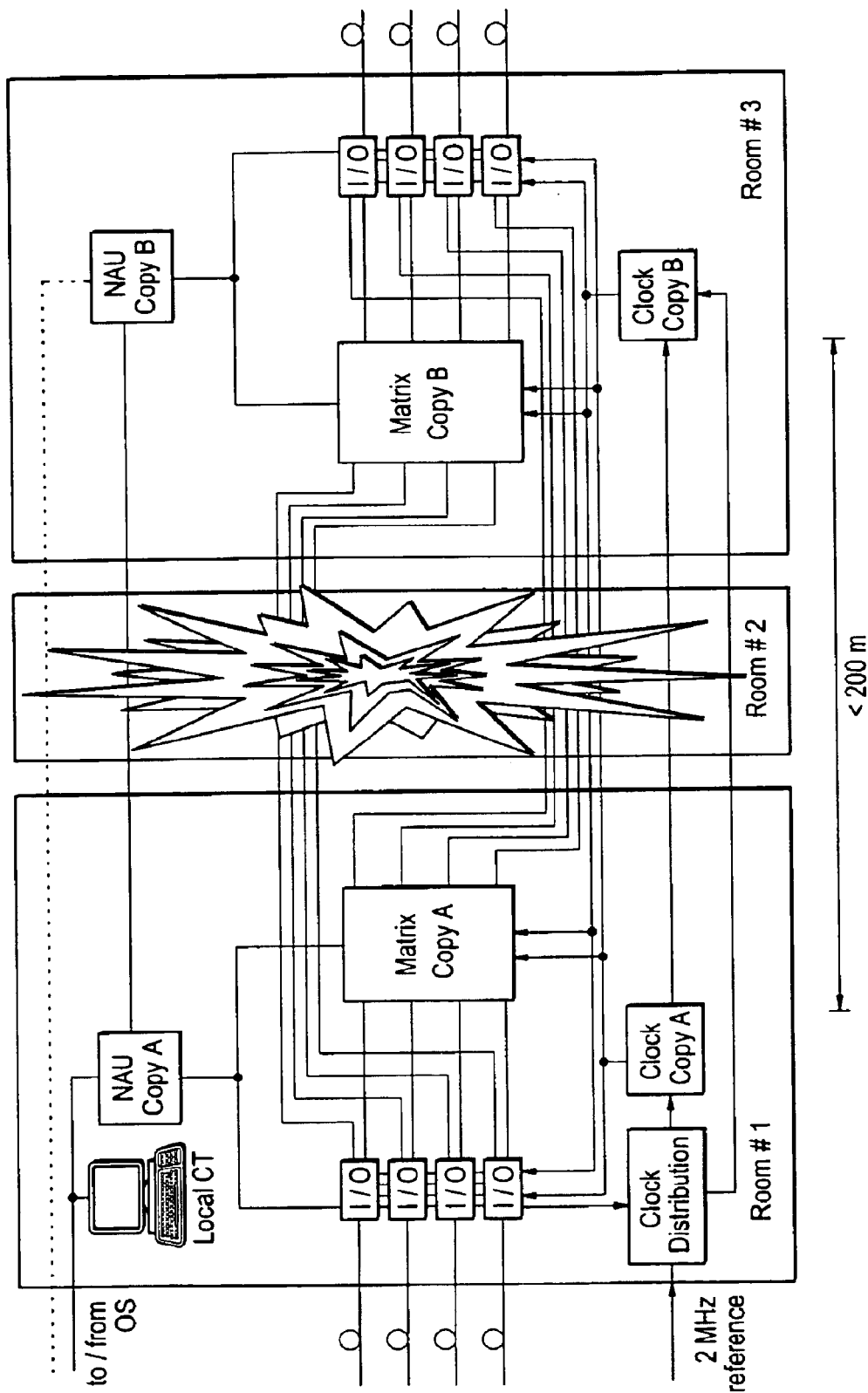
FIG. 5 shows the network element of FIG. 2 on the occurrence of an explosion in the area of the internal cabling.

FIG. 5 illustrates that an explosion is destroying the internal cabling between the two units of the crossconnect. As a result of the explosion, the traffic that is received in the first room and transmitted in the second room is lost. The effects on the remaining traffic and on the controllability of the crossconnect are as follows:

Interface modules 23 of the first unit that had selected the second switching matrix 22 switch to the first switching matrix 21. This results in a short interruption for data transmissions via these interface modules.

If the second clock supply 28 was the master clock supply for the first unit in the first room, switchover to the first clock supply 27 will be effected.

The status of the first controller 25 remains for the time being as it was. Alarms and messages of the first unit are still being stored on the hard disk of the first controller 25. If the second controller was the active one, the status of the first must be switched to "active" before access to the first unit of the crossconnect is possible. The first unit can then be controlled via the control terminal.

Interface modules 24 of the second unit that had selected the first switching matrix 21 switch to the second switching matrix 22. This results in a short interruption for data transmissions via these interface modules.

If the first clock supply 27 was the master clock supply for the second unit in the second room, switchover to the second clock supply 28 will be effected.

The status of the second controller 26 remains for the time being as it was. Alarms and messages of the second unit are still being stored on the hard disk of the second controller 26. To be able to access the second unit again, a new control terminal must be connected to the second controller or the connection to the first controller must be restored. To be able to access the second unit from the new control terminal, if the first controller was the active one, the status of the second will be switched to "active". The second unit can then be controlled via the new control terminal.

Thus, despite the explosion, the functional performance of the crossconnect is largely preserved. Via the central network management system, prioritized traffic that can no longer be switched from the interface modules of the first unit to those of the second unit due to the explosion can then be rerouted.

Figure 1:
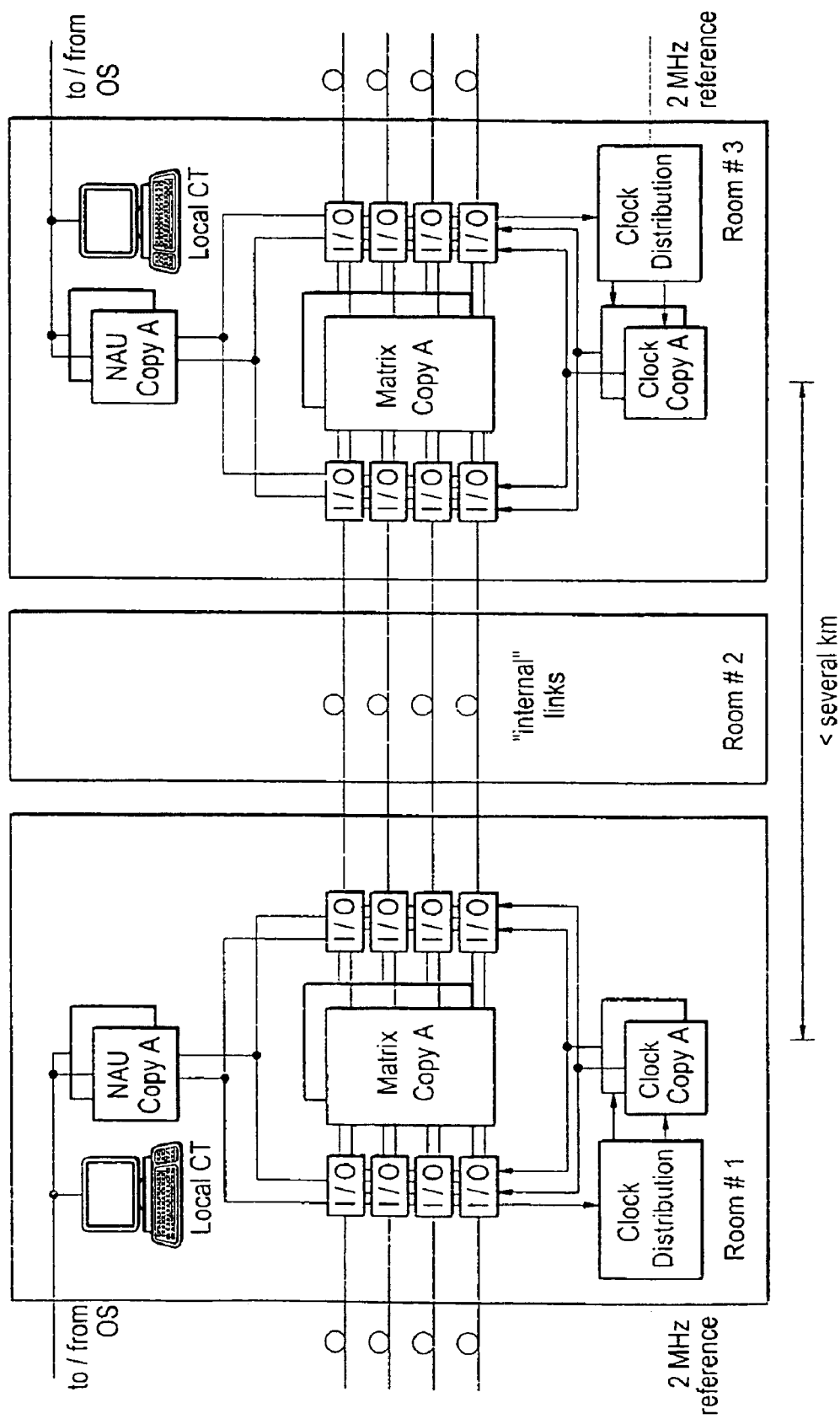
FIG. 1 shows a prior-art protection mechanism with two spatially separated, interconnected network elements.

In this way, efficient protection is provided for the crossconnect, for which substantially fewer components are required than with two pieces of equipment of identical construction. A comparison with FIG. 1 illustrates this. By this protective measure, a total failure of the crossconnect in the event of a disaster is prevented. If all equipment in one room is destroyed, at least half of the network element will remain operational.

For the sake of clarity, a crossconnect with only eight interface modules for STM-N signals was considered in the above embodiment. Crossconnects generally have a capacity of several hundred STM-1 equivalents, which, however, are switched through the matrix on the same principle.

While the invention was described in reference to a digital crossconnect for an SDH system, it is to be understood that the invention is also applicable to other network elements, such as add/drop multiplexers, and in other networks, such as SONET.

What is claimed is:

1. A single network element for a digital communications network, comprising
    a number of interface modules (23, 24),
    a first, active switching matrix (21), connected to the interface modules (23, 24), for switching paths between the interface modules,
    a second, redundant switching matrix (22), also connected to the interface modules (23, 24), and
    a first controller (25) for detecting a fault condition of the active switching matrix (21) and for switching to the redundant switching matrix (22), which is then used as a new active switching matrix,
    characterized in
    that the interface modules (23, 24) of said single network element are divided into two groups, and
    that each of the two switching matrices (21, 22) is combined with a respective one of the groups of interface modules (23, 24) to form said single network element into two separate units, which are interconnected by internal links (34), whereby the units can be installed in two separate rooms (31, 32).

2. A network element as claimed in claim 1 wherein a respective one of the switching matrices and a respective one of the groups of interface modules are installed as a unit in a rack.

3. A network element as claimed in claim 1 wherein the interface modules (23, 24) are optical interface modules designed for the connection of optical fibers of a fiber-optic communications system.

4. A network element as claimed in claim 1, wherein the internal links (34) are short-range optical links having a maximum fiber length of about 200 meters and requiring no dispersion compensation.

5. A network element as claimed in claim 1 wherein each of the two units is provided with its own clock supply, with one of the clock supplies at a time operating as an active clock supply and the other being available as a standby unit in the event of a failure.

6. A network element as claimed in claim 1, which comprises a second, redundant controller (26), wherein a respective one of the controllers (25, 26) is spatially associated with a respective one of the units, and wherein one of the controllers (25, 26) at a time operates as an active controller while the other is available as a standby unit in the event of a failure of the active controller.

7. A network element as claimed in claim 3, wherein the internal links (34) are short-range optical links having a maximum fiber length of about 200 meters and requiring no dispersion compensation.

8. A network element as defined in claim 1, wherein the units are installed in the two separate rooms (31, 32).

9. A network element as claimed in claim 8, wherein said internal links run through a third separate room.

* * * * *